United States Patent
Maass et al.

(10) Patent No.: US 8,897,982 B2
(45) Date of Patent: Nov. 25, 2014

(54) METHOD FOR DRIVING A HYBRID VEHICLE IN A LOAD REVERSAL

(75) Inventors: Alexander Maass, Ludwigsburg (DE); Jens-Werner Falkenstein, Aalen (DE); Markus Vogelgesang, Benningen Am Neckar (DE); Benjamin Klotz, Munich (DE); Manfred Hellmann, Hardthof (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 12/737,850

(22) PCT Filed: Aug. 10, 2009

(86) PCT No.: PCT/EP2009/060326
§ 371 (c)(1), (2), (4) Date: Aug. 8, 2011

(87) PCT Pub. No.: WO2010/023092
PCT Pub. Date: Mar. 4, 2010

(65) Prior Publication Data
US 2012/0022730 A1    Jan. 26, 2012

(30) Foreign Application Priority Data

Aug. 29, 2008 (DE) .................. 10 2008 041 693

(51) Int. Cl.
| | |
|---|---|
| G06F 7/00 | (2006.01) |
| B60K 23/08 | (2006.01) |
| B60W 30/20 | (2006.01) |
| B60W 10/06 | (2006.01) |
| B60K 6/52 | (2007.10) |
| B60W 10/08 | (2006.01) |
| B60W 20/00 | (2006.01) |

(52) U.S. Cl.
CPC ............ *B60W 30/20* (2013.01); *Y02T 10/6286* (2013.01); *B60W 2710/083* (2013.01); *B60W 20/00* (2013.01); *B60K 23/0808* (2013.01); *B60W 2540/10* (2013.01); *B60W 10/06* (2013.01); *B60K 6/52* (2013.01); *B60W 10/08* (2013.01); *Y02T 10/6265* (2013.01); *Y02T 10/642* (2013.01); *B60L 2240/423* (2013.01)
USPC ........................ 701/69; 180/65.265

(58) Field of Classification Search
CPC ..... B60W 20/00; B60W 20/10; B60W 20/40; B60W 30/20; Y02T 10/6286
USPC ........... 701/69, 22, 70, 51; 180/65.265, 65.25
See application file for complete search history.

(56) References Cited

U.S. PATENT DOCUMENTS

| | | |
|---|---|---|
| 2002/0107617 A1 | 8/2002 | Tomikawa |
| 2004/0104059 A1 | 6/2004 | Yamamoto et al. |

FOREIGN PATENT DOCUMENTS

| | | |
|---|---|---|
| CN | 1491830 | 4/2004 |
| CN | 101050729 | 10/2007 |
| DE | 35 42 059 | 6/1987 |
| DE | 100 17 281 | 10/2001 |
| FR | 2 901 747 | 12/2007 |
| JP | 2001-186603 | 7/2001 |
| WO | WO 2007/091172 | 8/2007 |

*Primary Examiner* — Thomas Tarcza
*Assistant Examiner* — Kevin Myhre
(74) *Attorney, Agent, or Firm* — Kenyon & Kenyon LLP

(57) ABSTRACT

A method for driving a hybrid vehicle during a load reversal includes: the application of a first torque on a first hybrid vehicle axle during an acceleration reversal; and the application of a second torque on a second hybrid vehicle axle during the acceleration reversal, a direction of action of the second torque being opposite to a direction of action of the first torque.

23 Claims, 1 Drawing Sheet

METHOD FOR DRIVING A HYBRID VEHICLE IN A LOAD REVERSAL

BACKGROUND OF THE INVENTION

1. Field of the Invention

The present invention relates to hybrid drives, in particular axle hybrids.

2. Description of Related Art

Modern hybrid vehicles such as so-called axle hybrids are equipped with hybrid drives, which may include an electric motor and a combustion engine. Axle hybrids are characterized by the fact that one of the vehicle axles is driven by one drive source, for example a combustion engine, and the other vehicle axle is driven by another drive source, for example an electric motor. In this context, the electric motor may operate as a generator, in the event of a braking operation for example, in order to recuperate the braking energy and to store it in a vehicle battery. Furthermore, the electric motor may be used to drive a switchable drive axle in the event of an increased slip of the wheels, as disclosed in the printed document published German patent document DE 3542059 C1.

To drive the vehicle, a propulsive torque is normally generated as a function of a gas or accelerator pedal position, which in an axle hybrid is always composed of a sum of the torques applied on the respective vehicle axles. Thus, at an accelerator pedal position of 0%, for example, a slight deceleration sets in, which is connected with a negative propulsive torque, a so-called overrun state of −20 Nm for example, a propulsive torque of 0 Nm sets in at an accelerator pedal position of approximately 10%, and a positive propulsive torque, a so-called traction state, sets in at an accelerator pedal position of above 10%.

When the sign of the propulsive torque changes, which is connected for example with a change of the propulsive torque from an overrun to a traction state, or in an acceleration reversal of the vehicle, in which a sign of the accelerating force is changed, a load reversal occurs, which may result in a torque zero crossing. The torque zero crossing may cause oscillations in the affected drive train, which may impact the operating behavior of the vehicle negatively or may be disagreeably noticeable to the driver. One possibility of reducing the load reversal oscillations is to slow down the zero crossing artificially, which has the consequence, however, that the vehicle following an accelerator pedal position at less than 10% is only able to accelerate again after a delay.

BRIEF SUMMARY OF THE INVENTION

The present invention is based on the realization that the oscillations produced by a load reversal may be reduced if during the load reversal, in which a change of the overall torque or the propulsive torque occurs, the different directions of action, i.e. the different signs of the axle torques, are maintained, for example by a reversal of a sign of the propulsive torque. Thus for example the sign of a torque produced by a combustion engine is maintained unchanged during a load reversal of the vehicle, which makes it possible to avoid the aforementioned zero crossing on the vehicle axle that is driven by the combustion engine. In order to brake the hybrid vehicle nevertheless, a negative torque may be set for example by the electric motor in such a way that the sum of the torques applied on the axles of the hybrid vehicle yields a negative overall torque or propulsive torque. In other words, only the zero crossing of the respective axle torque is permitted at which the least oscillations are to be expected, as may be the case for example in the torque produced by the electric motor. Alternatively, only the zero crossing of the respective axle torque is permitted, which is able to assume the lowest maximum value.

Thus, due to a more direct mechanical coupling of the electric motor to an electromotively driven axle, lower vehicle oscillations are to be expected in the zero crossing of the electromotively generated torque than is the case in a zero crossing of the torque generated by the combustion engine.

The present invention relates to a method for driving a hybrid vehicle using for example two drive sources acting on the respective hybrid vehicle axle in a load reversal including the application of a first torque on a first hybrid vehicle axle during the load reversal and the application of a second torque on a second hybrid vehicle axle during the load reversal, the direction of action of the second torque being opposite to a direction of action of the first torque.

According to one specific embodiment, the load reversal includes an acceleration reversal, in particular an acceleration sign change, or an acceleration change or a drive load reversal or a change of a sign of a sum of all drive torques or a sign change of an overall drive torque, in particular a change from an overrun to a traction state or from a traction to an overrun state.

According to one specific embodiment, the directions of action of the first torque and/or of the second torque are maintained during the load reversal such that none of the axles perform a load reversal.

According to one specific embodiment, after a predefined time following the occurrence of the load reversal, torques of the same direction of action, i.e. the same sign, are applied on the first hybrid vehicle axle and on the second hybrid vehicle axle. For this purpose, the direction of action of the first or of the second torque may be changed such that the load reversal affects only one of the torques. Furthermore, this causes no additional oscillations.

According to one specific embodiment, the load reversal is brought about by a braking of the hybrid vehicle, the direction of action of the first torque coinciding with a direction of rotation of the first hybrid vehicle axle during the load reversal, and the direction of action of the second torque being opposite to a direction of rotation of the second hybrid vehicle axle. The braking may therefore be effected by reversing a direction of rotation of a single torque.

According to one specific embodiment, the first hybrid vehicle axle is driven by a combustion engine or by an electric motor and the second hybrid vehicle axle is driven by an electric motor or by a combustion engine. Preferably, only the electromotively generated torque is changed for the load reversal regulation.

According to one specific embodiment, the respective torque is applied on the first hybrid vehicle axle and the second hybrid vehicle axle simultaneously so as to allow for a simple generation of an overall torque.

According to one specific embodiment, a value of the first torque is kept constant during the load reversal, whereby its zero crossing is avoided.

According to one specific embodiment, the first torque and/or the second torque are determined as a function of a difference between an actual overall torque, in particular a positive actual overall torque, and a setpoint overall torque, in particular a negative setpoint overall torque, the first and the second torques being generated in such a way that their sum corresponds to the setpoint overall torque. This allows for a simple determination of the total torque to be generated.

According to one specific embodiment, the first torque or the second torque or the direction of action of the first or the second torque are selected on the basis of a user-dependent or operation-dependent parameter, in particular on the basis of an accelerator pedal position or a gear change or a motor speed, or a driving operation or a gear speed or an uphill gradient or a downhill gradient of a road to be traveled or a motor speed or a dynamics of accelerator pedal movements or as a function of a charge state of a battery or of more than one of the aforementioned parameters.

The present invention further relates to a device set up in terms of program engineering, in particular a control unit, which is developed to run a computer program for implementing the method according to the present invention.

DETAILED DESCRIPTION OF THE INVENTION

Figure 1:
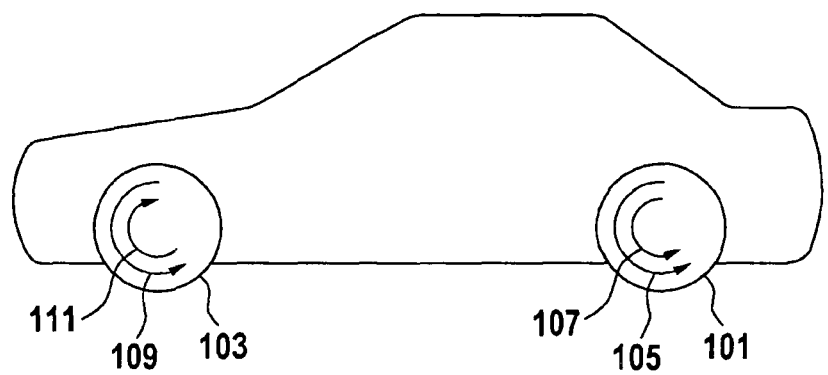
FIG. 1 shows a hybrid vehicle having two drive axles.

The hybrid vehicle shown in FIG. 1 includes a first axle 101, which has a torque generated by a combustion engine applied to it for example, and a second axle 103, which has a torque generated by an electric motor applied to it for example.

In the event of a vehicle load reversal, in which a change of the overall torque occurs for example in a transition from a traction state to an overrun state, it is nevertheless necessary to obtain a negative overall torque. For this purpose, the sign of the torque on vehicle axle 101 is maintained as positive for example, while the torque on vehicle axle 103 undergoes a zero crossing and becomes negative. The negative torque is selected in such a way for example that, in an accelerator pedal position of 0% for example, the sum of the torques acting on the axles of the hybrid vehicle yields a negative overall torque, whereby the vehicle decelerates. In the sense of the present invention, a torque is positive if its direction of action coincides with a direction of rotation of the axle, and it is negative if its direction of action is opposite to the direction of rotation of the axle.

The directions of action of the torques with respect to the vehicle axles in an accelerator pedal position of 0% are shown in exemplary fashion in FIG. 1. The directions of rotation of the two axles 101 and 103 are identical and are directed in such a way that the hybrid vehicle is moved forward. Thus the direction of action 105 of the torque, which is generated by the combustion engine for example, on first vehicle axle 101 coincides with a direction of rotation 107 of first vehicle axle 101 such that the sign of this torque is positive. By contrast, the direction of action 109 of the torque, which is generated by the electric motor for example, on second vehicle axle 103 is opposite to a direction of rotation 111 of second vehicle axle 103 such that the sign of the electromotive torque is negative.

If, after a load reversal or a movement of the accelerator pedal to 50% for example, the vehicle is accelerated again, then the torque, which is generated by the combustion engine for example, on axle 101 may be increased without a zero crossing so as to allow for a quick reacceleration that is low in vibration.

The respective operating mode or the load reversal to be expected is detectible on the basis of the accelerator pedal position for example. At an accelerator pedal position of 0% for example, it is thus possible to apply a braking torque of −30 Nm for example on the vehicle axle that is driven by the electric motor, while a torque of +15 Nm may be applied on the axle driven by the combustion engine in propulsion. This yields an overall torque of −15 Nm such that the vehicle is decelerated. At an accelerator pedal position of 0%, however, the propulsive torque on the axle driven by the combustion engine may also be +5 Nm or +10 Nm. The torque is preferably selected to be positive and of such a magnitude that the drive train of this axle is not brought into oscillation even when driving over bumps.

At an accelerator pedal position of 50% for example, the axle driven by the electric motor has a braking torque of −15 Nm applied to it for example. At the same time, the axle driven by the combustion engine in propulsion has +100 Nm applied to it for example, resulting in an overall torque of +85 Nm. This operating mode may be selected in sporty driving for example.

For further acceleration of the hybrid vehicle, however, a positive torque is applied to both axles. Thus, at an accelerator pedal position of 100% for example, the electromotively driven axle in propulsion is to have +100 Nm applied to it, while a propulsive torque of +300 Nm is to be applied on the axle driven by the combustion engine. If this operating mode follows upon an operating mode, in which the hybrid vehicle was decelerated, then the torque, which is applied on the electromotively driven axle, undergoes a change of sign, i.e. a zero crossing, while the torque generated by the internal combustion engine may be increased without a change of sign. This avoids a zero crossing of the torque generated by the combustion engine.

If, in an accelerator pedal position of 0% for example, the axle torques are selected in such a way that on one axle a direction of action of the torque coincides with a direction of rotation of this axle and on another axle a direction of action of the torque is opposite to a direction of rotation of this axle, then this may result in an increased tire abrasion for example. For this reason, the directions of action of the torques are selected to be identical after a predefined time following the occurrence of the load reversal, for example after 10 s or 20 s.

Furthermore, the torque or its direction of action may be selected for each axle as a function of a vehicle operating mode, for example a sport mode or an economical mode, of the selected gear, of an uphill gradient or of a downhill gradient of the road to be traveled, of a motor speed, of a dynamics of the accelerator pedal movements of the driver, for example in quick or frequent accelerator pedal movements, or as a function of a charge state of the battery or of more than one of the aforementioned parameters.

Figure 2:
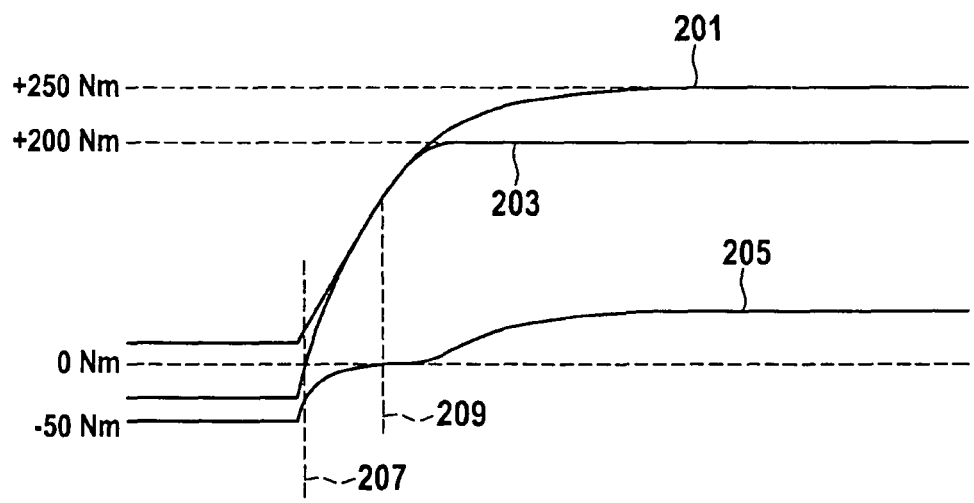
FIG. 2 shows torque variations over time.

The zero crossing of the torque that is generated electromotively for example may occur at a later time than the load reversal of the vehicle, for example the zero crossing of the vehicle propulsion, as is shown in FIG. 2. The zero crossing of the axle torque may also be performed at a time for example at which a gear speed change is performed for example so as to mask oscillations that possibly occur in the process.

FIG. 2 shows a time characteristic of an overall torque 201, a first torque 203, which is applied on the first vehicle axle 101, and a second torque 205, which is applied on the second vehicle axle 103. Starting for example from a decelerated travel following a previous load reversal (not shown in FIG. 2), a new load reversal occurs at time 207, in which the overall torque 201 undergoes a zero crossing and becomes positive for example. At this time, the directions of action of torques 203 and 205 differ such that at the time of the load reversal first torque 203 is positive and second torque 205 is negative. After the load reversal has occurred, both torques rise, second 205 undergoing a zero crossing at time 209 and becoming positive such that from this time onward the directions of action of both torques are identical. The time interval between times 207 and 209 defines for example a specified time, for example 1 s or 2 s, after the expiration of which the directions of action of the two torques are synchronized.

According to the present invention, the degrees of freedom provided by the axle hybrid concept are thus utilized efficiently. Thus, in an overrun state for example, the drive torque on one of the axles, on the axle driven by the combustion engine for example, may remain positive. This achieves the result that the load reversal, e.g. the acceleration reversal of the vehicle, requires a zero crossing only on one axle.

What is claimed is:

1. A method for operating a hybrid vehicle, comprising:
identifying an impending zero crossing of a propulsive torque of the hybrid vehicle from a negative propulsive torque to a positive propulsive torque; and
prior to and during the zero crossing of the propulsive torque of the hybrid vehicle, maintaining a positive first torque supplied to a first hybrid vehicle axle by a combustion engine and a negative second torque supplied to a second hybrid vehicle axle by an electric motor;
implementing a zero crossing of the second torque supplied by the electric motor to the second hybrid vehicle axle at a predefined time after the zero crossing of the propulsive torque of the hybrid vehicle; and
adjusting a magnitude of each of the first and second torques so that a sum of the first and second torques equals a target propulsive torque value.

2. The method as recited in claim 1, wherein at least one of the direction of action of the first torque and the direction of action of the second torque is maintained during the zero crossing of the propulsive torque of the hybrid vehicle.

3. The method as recited in claim 1, wherein, after the predefined time following the occurrence of the zero crossing of the propulsive torque of the hybrid vehicle, torques of the same direction of action are respectively applied on the first hybrid vehicle axle and on the second hybrid vehicle axle.

4. The method as recited in claim 1, wherein the zero crossing of the propulsive torque of the hybrid vehicle is achieved by a braking of the hybrid vehicle, the direction of action of the first torque coincides with a direction of rotation of the first hybrid vehicle axle during the zero crossing of the propulsive torque of the hybrid vehicle, and the direction of action of the second torque is opposite to a direction of rotation of the second hybrid vehicle axle.

5. The method as recited in claim 1, wherein the first and second torques are applied simultaneously on the first hybrid vehicle axle and on the second hybrid vehicle axle.

6. The method as recited in claim 1, wherein at least one of the first torque and the second torque is determined as a function of a difference between an actual overall torque and a setpoint overall torque, the first and the second torques being generated in such a way that the sum of the first torque and the second torque corresponds to the setpoint overall torque.

7. The method as recited in claim 1, wherein one of the first torque, the second torque, the direction of action of the first torque, or the direction of action of the second torque is selected on the basis of at least one of an accelerator pedal position, a gear change, a motor speed, a gear speed, a gradient of a road traveled, dynamics of an accelerator pedal movement, and a charge state of a battery.

8. A control unit for operating a hybrid vehicle, comprising:
means for controlling application of a first torque on a first hybrid vehicle axle; and
means for controlling application of a second torque on a second hybrid vehicle axle,
wherein responsive to the control unit identifying an impending zero crossing of a propulsive torque of the hybrid vehicle, the control unit controls application of the first and second torques to:
maintain, prior to and during the zero crossing of the propulsive torque of the hybrid vehicle, a positive value of the first torque supplied to the first hybrid vehicle axle by a combustion engine and a negative value of the second torque supplied to the second hybrid vehicle axle by an electric motor;
implement a zero crossing of the second torque supplied by the electric motor to the second hybrid vehicle axle at a predefined time after the zero crossing of the propulsive torque of the hybrid vehicle; and
adjust a magnitude of the first and the second torques so that a sum of the first and the second torques equals a target propulsive torque value.

9. The control unit as recited in claim 8, wherein at least one of the direction of action of the first torque and the direction of action of the second torque is maintained during the zero crossing of the propulsive torque of the hybrid vehicle.

10. The control unit as recited in claim 8, wherein, after the predefined time following the occurrence of the zero crossing of the propulsive torque of the hybrid vehicle, torques of the same direction of action are respectively applied on the first hybrid vehicle axle and on the second hybrid vehicle axle.

11. The control unit as recited in claim 8, wherein the zero crossing of the propulsive torque of the hybrid vehicle is achieved by a braking of the hybrid vehicle, the direction of action of the first torque coincides with a direction of rotation of the first hybrid vehicle axle during the zero crossing of the propulsive torque of the hybrid vehicle, and the direction of action of the second torque is opposite to a direction of rotation of the second hybrid vehicle axle.

12. The control unit as recited in claim 8, wherein at least one of the first torque and the second torque is determined as a function of a difference between an actual overall torque and a setpoint overall torque, the first and the second torques being generated in such a way that the sum of the first torque and the second torque corresponds to the setpoint overall torque.

13. The control unit as recited in claim 8, wherein one of the first torque, the second torque, the direction of action of the first torque, or the direction of action of the second torque is selected on the basis of at least one of an accelerator pedal position, a gear change, a motor speed, a gear speed, a gradient of a road traveled, dynamics of an accelerator pedal movement, and a charge state of a battery.

14. A method for operating a hybrid vehicle, comprising:
prior to and during a zero crossing of a propulsive torque of the hybrid vehicle from a negative to a positive propulsive torque, maintaining a positive first torque supplied to a first hybrid vehicle axle by a combustion engine and a negative second torque supplied to a second hybrid vehicle axle by an electric motor; and
implementing a zero crossing of the second torque supplied by the electric motor to the second hybrid vehicle axle at a predefined time after the zero crossing of the propulsive torque of the hybrid vehicle.

15. The method as recited in claim 14, wherein at least one of the direction of action of the first torque and the direction of action of the second torque is maintained during the zero crossing of the propulsive torque of the hybrid vehicle.

16. The method as recited in claim 14, wherein, after the predefined time following the occurrence of the zero crossing of the propulsive torque of the hybrid vehicle, torques of the same direction of action are respectively applied on the first hybrid vehicle axle and on the second hybrid vehicle axle.

17. The method as recited in claim 14, wherein the first and second torques are applied simultaneously on the first hybrid vehicle axle and on the second hybrid vehicle axle.

18. The method as recited in claim 14, wherein at least one of the first torque and the second torque is determined as a function of a difference between an actual overall torque and a setpoint overall torque, the first and the second torques being generated in such a way that the sum of the first torque and the second torque corresponds to the setpoint overall torque.

19. A control unit for operating a hybrid vehicle, the control unit comprising:
   means for controlling application of a first torque on a first hybrid vehicle axle; and
   means for controlling application of a second torque on a second hybrid vehicle axle,
   wherein the control unit controls application of the first and second torques to:
      prior to and during a zero crossing of a propulsive torque of the hybrid vehicle from a negative to a positive propulsive torque, maintain a positive first torque supplied to a first hybrid vehicle axle by a combustion engine and a negative second torque supplied to a second hybrid vehicle axle by an electric motor; and
      implement a zero crossing of the second torque supplied by the electric motor to the second hybrid vehicle axle at a predefined time after the zero crossing of the propulsive torque of the hybrid vehicle.

20. The control unit as recited in claim 19, wherein at least one of the direction of action of the first torque and the direction of action of the second torque is maintained during the zero crossing of the propulsive torque of the hybrid vehicle.

21. The control unit as recited in claim 19, wherein, after the predefined time following the occurrence of the zero crossing of the propulsive torque of the hybrid vehicle, torques of the same direction of action are respectively applied on the first hybrid vehicle axle and on the second hybrid vehicle axle.

22. The control unit as recited in claim 19, wherein the first and second torques are applied simultaneously on the first hybrid vehicle axle and on the second hybrid vehicle axle.

23. The control unit as recited in claim 19, wherein at least one of the first torque and the second torque is determined as a function of a difference between an actual overall torque and a setpoint overall torque, the first and the second torques being generated in such a way that the sum of the first torque and the second torque corresponds to the setpoint overall torque.

* * * * *